UNITED STATES PATENT OFFICE 2,320,844

PREPARATION OF ORGANIC ACID ESTERS

Howard C. Black, Chicago, Ill., assignor to Industrial Patents Corporation, Chicago, Ill., a corporation of Delaware No Drawing. Application November 10, 1941, Serial No. 418,554

14 Claims. (Cl. 260—410.7)

The invention is directed to the preparation of organic acid esters, and more particularly it is directed to the preparation of fatty acid partial esters of polyhydric alcohols.

The number of uses for polyhydric alcohol partial esters has increased tremendously in recent years; hence the production of these compounds becomes of increasing importance. While methods have been devised for their synthesis much room for improvement in their commercial manufacture still remains. Various catalysts have been suggested but, in many cases, the removal of these agents is not conveniently accomplished. Ordinarily low temperatures must be employed to prevent discoloration of the product, but the reaction rates are substantially reduced. For example, it is known that glycerol will react with fatty acids and triglycerides thereof at temperatures well above 200° C. to yield dark colored mixtures mainly containing diglycerides and some monoglycerides. Kieselguhr and fuller's earth have been mentioned as possible catalysts for such a reaction, but only a slight increase in reaction rate, if any, is accomplished even at the temperatures well above 200° C. The appearance and the purity of the product is not materially improved thereby.

It has now been found possible to produce these agents at a substantially rapid rate at higher temperatures without discoloration of the product, in fact, with the formation of product of improved organoleptic properties.

The preparation of fatty acid monoglycerides or other carboxylic acid esters by the present invention involves mixing the alcohol and carboxylic acid derivatives in suitable ratio, such as a properly proportioned mixture of glycerol and higher fatty acid, acid halide, ester or anhydride, in the presence of activated carbon either in an inert atmosphere, under vacuum or in certain cases in a reaction tube. The temperature depends on the particular ester being formed, the type and proportion of reactants, the presence and rate of removal of product or products, the quantity of activated carbon, the presence of other catalysts or anti-catalysts, and the like. Ordinarily a temperature of 200° to 300° C., preferably 270° to 290° C., is employed. Such temperatures of reaction are higher than those generally employed since they have been considered to be detrimental to color, to cause decomposition, and to yield undesirable by-products. However, a high yield of the desired ester, such as a monoglyceride of excellent appearance and purity results in a surprisingly short time.

The process is especially effective in the preparation of monoglycerides from saturated or unsaturated fatty acids and other carboxylic ester products ordinarily lacking in stability at high temperatures. The reaction is preferably conducted at or near the boiling point of the reaction mixture and, therefore, the temperature depends on the particular ester being formed. With partial glycerides it is usually in the range of about 270° to 300° C.

To prepare partial glycerides by the present method, about ten parts by weight of normal fat triglycerides and about two to three parts by weight of glycerol, together with sufficient activated carbon to equal about 0.05% to 10%, e. g. 0.1 to 1.0%, on the basis of the fat, are drawn from suitable storage tanks into a closed cylindrical reaction vessel equipped with an agitator or paddle and facilities for providing vacuum and an atmosphere of inert gas such as carbon dioxide. The temperature of the reactants is raised to about 220° F. under a high vacuum in order to permit thorough drying. At this point the vacuum is broken by means of the addition of carbon dioxide gas. Heat is continuously applied while maintaining the atmosphere of carbon dioxide and agitating the mixture until the temperature reaches about 525° F. The temperature is maintained until, by a suitable analysis, the reaction is shown to be complete, that is until no further absorption of glycerol is occurring. This is usually determined by periodically observing the refractive index until no further change occurs. The heat is then turned off and the product of the reaction cooled down to approximately 100° F. The product is drawn to a sump tank in which it is admixed with a filter coating material such as kieselguhr. The filtered product is pumped through a filter press, wherein the carbon is removed, to another sump tank and then to a large cylindrical jacketed tank in which the product is settled overnight to remove any excess glycerin that may be present. The partial ester product then is given a steam deodorization under a high vacuum and at a high temperature of about 325° F. to 400° F. for about one hour, usually with heat applied to the vapor zone to prevent reflux. The deodorized product is then cooled down and filled into suitable packages or used directly in various compositions.

The use of two parts of glycerol to ten of triglyceride will produce a diglyceride type product whereas the larger amount will produce mainly monoglyceride materials. About two and one-quarter parts of glycerol to ten parts of fat, such as hydrogenated cottonseed oil of iodine number of about 80, has been found particularly satisfactory in preparing a product to be used in shortenings.

The activated carbon not only catalyzes the reaction but preserves the reactants and the products even at these high temperatures normally believed to be impractical for the manufacture of desirable products.

When no activated carbon is present the reaction between glycerol and hydrogenated cottonseed oil at the boiling point of glycerol takes about 2½ hours to 3 hours to yield product of poor color and odor, whereas in the presence of 5% of activated carbon the reaction takes place in about fifteen minutes to yield light colored product of excellent odor. Other reactions carried out at the boiling point of glycerol and employing 0.1%, 0.5%, and 1% of activated carbon likewise give desirable products at a slightly slower rate.

Other catalysts may be present during the reaction including various alkaline or potentially alkaline materials such as caustic alkalies, salts of a strong base and a weak acid of the type of sodium carbonate and sodium oleate, alcoholates, and other agents capable of reacting with fatty esters to form soap. This class of materials is generally recognized as alkaline esterification catalysts and may be employed in the proportion of a fraction of a per cent to about 5% or higher. The use of the alkaline catalysts with activated carbon gives exceptionally good results both as to rate of reaction and as to purity of product when operating at higher or lower temperature, e. g. 100° to 300° C.

It is possible to vary the method of operations so as to remove water during the reaction. This may be done by refluxing without condensation of water vapors issuing from the reaction vessel. It is also possible to change the refluxing temperature by adding an inert solvent which boils at a lower temperature than the reaction mixture per se. A non-reactive gas such as nitrogen or carbon dioxide may also be passed through the reaction mixture in order to carry out any water. This also serves to agitate the reacting mass. Vacuum is preferably used with any of these systems wherein water is to be removed.

Water is generated in substantial quantities in the reaction between glycerol and fatty acids, hence these dehydration and reaction conditions are particularly suited for this type reaction. On the other hand, however, they can be used in other esterification processes wherein water is not generated by the esterification reaction itself but may be present or generated in the reactants themselves.

Although the process may be operated at lower temperature, it is preferred to employ temperatures of the order of 250° to 300° C., e. g., 270° C.

Although it is preferred to employ glycerin other polyhydric alcohols may be employed such as glycol, diethylene glycol, propylene glycol, mannitol, sorbitol, or the like. If desired, monohydric alcohols may be similarly esterified alone or in admixtures with the polyhydric alcohols.

Any fatty oil or fat such as cottonseed oil, lard, tallow, soy bean oil, palm oil, coconut oil, peanut oil, spermaceti, sperm oil, and mixtures thereof may be used in preparing the esters. The individual fatty acids in these oils or fats or mixtures thereof or their anhydrides may be used to form the esters including the saturated and unsaturated aliphatic acids containing six or more carbon atoms in the molecule, such as caproic acid, lauric acid, palmitic acid, stearic acid, oleic acid, linoleic acid, myristic acid, linolenic acid, undecenoic acid, palmitoleic acid, elaidic acid, and the like. Synthetic fatty acids such as those obtained by the oxidation of paraffin may also be used.

As many widely different embodiments of the present invention may be made without departing from the spirit or scope thereof, it is understood that it is not to be limited except as set forth in the following claims.

I claim:

1. The process which comprises esterifying an alcohol with a long chain carboxylic acid compound of the class consisting of carboxylic acids, carboxylic acid esters, carboxylic acid anhydrides, and carboxylic acid halides in the presence of activated carbon and at an elevated temperature.

2. The process which comprises reacting an aliphatic polyhydroxy substance with a long chain fatty compound of the class consisting of carboxylic acids, carboxylic acid esters, carboxylic acid anhydrides, and carboxylic acid halides in the presence of activated carbon and an alkaline esterification catalyst and at an elevated temperature.

3. The process which comprises reacting a polyhydric alcohol with a long chain fatty compound of the class consisting of carboxylic acids, carboxylic acid esters, carboxylic acid anhydrides, and carboxylic acid halides in the presence of a fraction of a per cent to 10% of activated carbon and at an elevated temperature.

4. The process which comprises reacting glycerin with a fatty oil in the presence of 0.05% to 10% of activated carbon.

5. The process which comprises esterifying a polyhydric alcohol with a fatty compound of the class consisting of carboxylic acids, carboxylic acid esters, carboxylic acid anhydrides, and carboxylic acid halides in the presence of 0.05% to 10% of activated carbon and at a temperature of between 200° to 300° C.

6. The process which comprises esterifying an alcohol with a fatty acid compound of the class consisting of carboxylic acids, carboxylic acid esters, carboxylic acid anhydrides, and carboxylic acid halides in the presence of activated carbon and at an elevated temperature of between 200° to 300° C.

7. The process for the preparation of partial glycerol esters from fats and oils which comprises reacting said fats and oils with a polyhydric alcohol in the presence of heat and activated carbon.

8. The process for the preparation of diglycerides and monoglycerides of higher fatty acids which comprises subjecting a triglyceride fat to the action of glycerine in the presence of activated carbon and at an elevated temperature.

9. The process for the preparation of partial esters of the class consisting of monoglycerides and diglycerides which comprises subjecting a triglyceride fat to the action of glycerin in the presence of about 0.05 to 10 per cent of activated carbon and at a temperature of about 200° C. to 300° C. for sufficient time to produce a substantial amount of said partial esters.

10. The process for the preparation of partial esters of the class consisting of monoglycerides and diglycerides which comprises subjecting a vegetable triglyceride fat for a short period of time to the action of glycerin in the proportion of about ten parts by weight of fat to about two to three parts by weight of glycerin in the presence of about 0.1 to 1 per cent of activated carbon and at a temperature of about 270° C. to 300° C.

11. A process according to claim 10 in which the vegetable triglyceride fat is hydrogenated cottonseed oil.

12. A process according to claim 10 in which the time of reaction between the triglyceride fat and the glycerin is about 15 minutes.

13. The process for the preparation of partial esters of triglyceride fats adapted for use in shortenings which comprises subjecting about ten parts of triglyceride fat and about two and one-quarter parts of glycerol to elevated temperatures in the presence of a small amount of activated carbon for sufficient time to produce a substantial amount of said partial esters.

14. The process according to claim 13 in which the triglyceride fat is hydrogenated cottonseed oil of about 80 iodine number.

HOWARD C. BLACK.